United States Patent [19]

Crooks et al.

[11] Patent Number: 5,943,656
[45] Date of Patent: Aug. 24, 1999

[54] METHODS AND SYSTEMS FOR COMPUTERIZED BILL CONSOLIDATING, BILLING AND PAYMENT AUTHORIZATION, COMPUTERIZED UTILITY BILL CONSOLIDATING, UTILITY BILLING ACCESS AND PAYMENT AND UTILITY PROVIDER CONSOLIDATED BILLING SYSTEMS

[75] Inventors: Gerry Crooks; Janna Genzberger; Ed Arnhold; John Battista, all of Spokane, Wash.; Ken Boni, Hayden Lake, Id.; Dave Miller; Mark Feichtner, both of Spokane, Wash.; Larry Kippenhan, Greenacres, Wash.; Shawn Nanto, Spokane, Wash.; Teri Orr, Greenacre, Wash.; Dan Bowers, Boise, Id.

[73] Assignee: Avista Advantage, Inc., Spokane, Wash.

[21] Appl. No.: 08/984,708

[22] Filed: Dec. 3, 1997

[51] Int. Cl.⁶ .................................................. G06F 17/60
[52] U.S. Cl. ................................. 705/30; 705/1; 705/34; 707/104
[58] Field of Search ........................... 395/200.3, 200.33, 395/200.47, 200.48, 200.49; 705/1, 30, 34, 400, 412, 413; 707/104; 709/200, 203, 227, 218, 219

[56] References Cited

U.S. PATENT DOCUMENTS

| | | | |
|---|---|---|---|
| 3,852,571 | 12/1974 | Hall et al. | 235/379 |
| 4,485,300 | 11/1984 | Peirce | 235/380 |
| 4,701,601 | 10/1987 | Francini et al. | 235/449 |
| 4,734,564 | 3/1988 | Boston et al. | 235/380 |
| 4,803,632 | 2/1989 | Frew et al. | 705/412 |
| 4,839,504 | 6/1989 | Nakano | 235/379 |
| 4,893,248 | 1/1990 | Pitts et al. | 705/400 |
| 4,949,272 | 8/1990 | Vanourek et al. | 705/410 |
| 5,206,488 | 4/1993 | Teicher | 235/380 |
| 5,220,501 | 6/1993 | Lawlor et al. | 380/24 |
| 5,283,829 | 2/1994 | Anderson | 380/24 |
| 5,287,270 | 2/1994 | Hardy et al. | 705/34 |
| 5,325,290 | 6/1994 | Cauffman et al. | 705/34 |
| 5,326,959 | 7/1994 | Perazza | 235/379 |
| 5,383,113 | 1/1995 | Kight et al. | 705/40 |
| 5,477,038 | 12/1995 | Levine et al. | 235/380 |
| 5,483,445 | 1/1996 | Pickering | 705/40 |
| 5,655,089 | 8/1997 | Bucci | 705/40 |
| 5,664,115 | 9/1997 | Fraser | 705/37 |
| 5,684,951 | 11/1997 | Goldman et al. | 395/188.01 |
| 5,684,965 | 11/1997 | Pickering | 705/34 |
| 5,710,884 | 1/1998 | Dedrick | 395/200.47 |
| 5,717,923 | 2/1998 | Dedrick | 707/102 |

FOREIGN PATENT DOCUMENTS

0745947A2  12/1996  European Pat. Off. .

Primary Examiner—Edward R. Cosimano
Attorney, Agent, or Firm—Wells, St. John, Roberts, Gregory & Matkin, P.S.

[57] ABSTRACT

Computerized billing and payment authorization methods and systems are described. In one aspect, a host system includes a database in which information associated with a billable entity from which payment is to be received is stored. Billing information is received from a billing entity and is associated with a bill for payment by the billable entity. The billable entity is provided with remote electronic access to the billing information in the host computer and can authorization payment thereof. In one implementation, the billing information is scrutinized in accordance with pre-determined tolerance parameters prior to the billable entity gaining access thereto. In another implementation, a plurality of billing entities provide billing information to the host system, with the billing information being subsequently checked and consolidated into a consolidated amount which can be remotely accessed by the billable entity. In a preferred implementation a plurality of utility providers are incorporated into the system and providing billing information for customers which may have a number of different, geographically-separated sites being serviced by different utilities. The billing information is consolidated and made available electronically through access which is initiated by the customer. Preferably, the systems and methodologies of the invention are implemented in connection with a multi-user computer network such as the Internet.

44 Claims, 10 Drawing Sheets

SRS/ACIS

This web site allows easy access to ACIS Services for Consolidated Billing. If you have any questions, please use our Q&A e-mail and you will receive a reply within 24 hours.

Please enter your company's name and password

Company Name: _____ 102

Password: _____ 104

[Login]

ACIS Suites Consolidated Bills

Your Utility Account(s) with Avista Advantage have been consolidated for you in the following table. Clicking your mouse on any cell of the account level column will display for you the components (the individual accounts) of the aggregated bill for that particular billing period. Please send us your suggestions on how to make this service even more beneficial for you.

If you see the Symbol G/L in the G/L column below, right click on the symbol and select SAVE TARGET AS.. from the menu that pops up. Select a location to save the file on your local system and press the SAVE button to begin the download of your General Ledger file.

If you see the Symbol I/V in the I/V column below, just click on it to view your Invoice online.

| I/V | Invoice Data/Billing Date | Invoice # | Invoice Amt | Last Payment | Consolidated Charges | # of Bills | Acct Level | G/L |
|---|---|---|---|---|---|---|---|---|
| I/V | June 3, 1997 | 119 | $13,898.86 | | $13,898.86 | 8 | Details | |
| I/V | May 27, 1997 | 118 | $32,000.95 | | $32,000.95 | 12 | Details | |
| I/V | May 20, 1997 | 117 | $19,009.13 | | $18,509.13 | 9 | Details | |

Ask our staff

FIG. 11

```
Avista Advantage: Consolidated Billing                           _ □ x
File  Edit  View  Go  Favorite  Help
 ⇦     ⇨    ⊗    ↻     ⇧      ⚲      ▯       🗔     🖨    A    🖂    ✎
Back Forward Stop Refresh Home Search Favorites Print Font Mail Edit
Address http://
       ┌──────┐
       │ ACIS │  ▽ Consolidated Billing       ▽ Ask our
       └──────┘                                  staff ACIS Suites Utility Account Details for 5/27/97

Your Utility Bills have been consolidated for you in the following table. Clicking your
mouse on any cell of the service details column will display for you the individual bill
and its associated services breakdowns. Please send us your suggestions on how to
make this service even more beneficial for you.
```
                                                                            ╱ 122

| Site | Address | Utility | Utility Acct Number | Bill Date | Total Bill | Service Details |
|------|---------|---------|---------------------|-----------|------------|-----------------|
| Denver Mountain Suites | Cherry Hill Village Denver CO | Public Service Company of Colorado | 5887891872 | 22-May-97 | $8,213.23 | Details |
| Denver Mountain Suites | Cherry Hill Village Denver CO | Public Service Company of Colorado | 1992584182 | 22-May-97 | $471.17 | Details |
| Detroit Luxury Suites | 250 Lincoln Park Way Detroit MI | City of Grand Rapids Water &S | 12-900-60-7 | 21-May-97 | $4,902.11 | Details |
| Hartford Village Suites | Welles Village Hartford CT | Connecticut Light & Power | 658932 | 21-May-97 | $3,727.81 | Details |

122a → Details
122b → Details
122c → Details
122d → Details

Hartford Village Suites Service Details For Connecticut Light & Power

| Service | Meter | Begin Date | End Date | Days | Quantity | Units | Tax | Amount |
|---|---|---|---|---|---|---|---|---|
| Demand | | 23-April-97 | 23-May-97 | 29 | 135 | Kw | $0.00 | $0.00 |
| Elec Cust Chrg | | 23-April-97 | 23-May-97 | 29 | 0 | | $0.00 | $59.50 |
| Electric | | 23-April-97 | 23-May-97 | 29 | 58,113 | KWh | $177.52 | $3,490.79 |
| Electric Kvar | | 23-April-97 | 23-May-97 | 29 | 7,141 | kvar | $0.00 | $0.00 |

FIG. 12

METHODS AND SYSTEMS FOR COMPUTERIZED BILL CONSOLIDATING, BILLING AND PAYMENT AUTHORIZATION, COMPUTERIZED UTILITY BILL CONSOLIDATING, UTILITY BILLING ACCESS AND PAYMENT AND UTILITY PROVIDER CONSOLIDATED BILLING SYSTEMS

TECHNICAL FIELD

This invention relates to computerized billing and payment authorization methods and systems, and computerized bill consolidating and payment authorization methods and systems. More particularly, it concerns utility billing access and payment methods and systems, utility billing access and consolidating methods and systems, and utility provider consolidated billing systems.

BACKGROUND OF THE INVENTION

Typically, customers or consumers receive a large number of bills relating to services and/or goods received or purchased during a particular billing cycle. Such bills are typically mailed or otherwise provided in hard-copy form to the customer or consumer. The customer or consumer then reviews the bills and sends a check or suitable payment to the originator of the bill. As customers or consumers receive larger and larger amounts of bills, the receipt, review, and payment process is needlessly complicated.

Certain types of customers or consumers are corporations or businesses. Corporations typically receive a very large number of bills during any one billing cycle. If the corporation or business has a large number of facilities, it will typically receive bills, such as utility bills, for each of its facilities. Needless to say, receiving, reviewing, tracking, and paying each bill is, and continues to be a laborious, time intensive undertaking. Moreover, if a bill is disputed, the corporation or business must take the time to contact the originator of the bill and take time to go through the originator's remedial process for rectifying the bill.

Against this backdrop, methods and systems of consolidating bills have developed. Largely, such systems are directed to individual consumers. A typical system is disclosed in U.S. Pat. No. 5,655,089 to Bucci. Bucci's system is an individual-based system which receives billing information for a consumer and sends, through the mail, a hardcopy statement to the consumer for payment. The consumer receives the statement and returns payment in a single envelope. Bucci's system, while representing a modest improvement over the above-described mass mailing system, fails to fully solve time-, effort-, and resource-associated problems with the above-described mass mailing system.

Accordingly, this invention arose out of concerns associated with providing improved billing and payment systems. In particular, this invention arose out of concerns associated with providing improved billing and payment systems which can utilized in connection with utility providers.

SUMMARY OF THE INVENTION

Computerized billing and payment authorization methods and systems are described. In one aspect, a host system includes a database in which information associated with a billable entity from which payment is to be received is stored. Billing information is received from a billing entity and is associated with a bill for payment by the billable entity. The billable entity is provided with remote electronic access to the billing information in the host computer and can authorization payment thereof. In one implementation, the billing information is scrutinized in accordance with pre-determined tolerance parameters prior to the billable entity gaining access thereto. In another implementation, a plurality of billing entities provide billing information to the host system, with the billing information being subsequently checked and consolidated into a consolidated amount which can be remotely accessed by the billable entity. In a preferred implementation a plurality of utility providers are incorporated into the system and provide billing information for customers which may have a number of different, geographically-separated sites being serviced by different utilities. The billing information is consolidated and made available electronically through access which is initiated by the customer. Preferably, the systems and methodologies of the invention are implemented in connection with a multi-user computer network such as the Internet.

BRIEF DESCRIPTION OF THE DRAWINGS

Preferred embodiments of the invention are described below with reference to the following accompanying drawings.

FIG. 8 is a view of an interactive computer screen implemented in connection with a preferred embodiment of the present invention.

FIG. 10 is a view of another interactive computer screen implemented in connection with a preferred embodiment of the present invention.

FIG. 11 is a view of another interactive computer screen implemented in connection with a preferred embodiment of the present invention.

FIG. 12 is a view of another interactive computer screen implemented in connection with a preferred embodiment of the present invention.

DETAILED DESCRIPTION OF THE PREFERRED EMBODIMENTS

With reference to the various systems and methodologies of the present invention, as described below, aspects of the present invention are described in terms of steps executed or executable on a computer system. Although a variety of different computer systems can be used with the present invention, an exemplary computer system is shown generally at 20 in FIG. 1.

Figure 1:
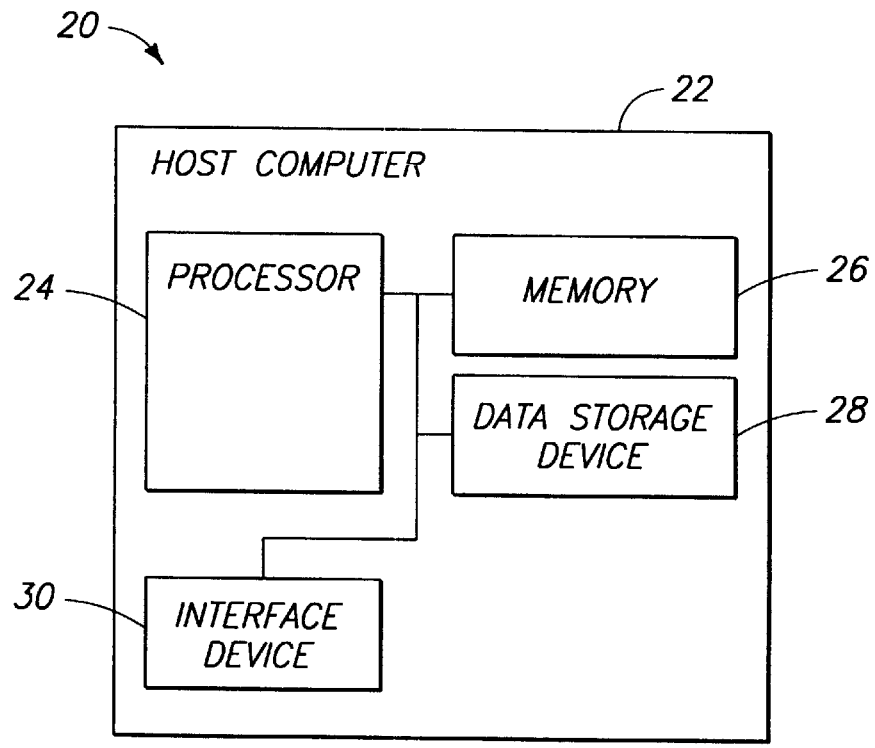
FIG. 1 is a block diagram of a computer system which is suitable for implementing the methodologies and systems of the present invention.

Computer system 20 includes a host computer 22 having a processor 24, memory 26, data storage device 28, and an interface device 30. The exemplary components 24-30 of host computer 22 are operably connected via an address/data bus which is not specifically designated. Memory 26 can, and preferably does include a volatile memory (e.g. random access memory) which is coupled with the data bus for storing information and instructions for processor 24, and a non-volatile memory (e.g. read only memory) coupled with the data bus for storing static information and instructions for processor 24. Data storage device 28 can comprise a mass storage device. Host computer 22 constitutes a hardware platform which executes instructions to implement the application program(s) described just below. It will be understood that system 20, as set forth in FIG. 1, is a schematic representation only. Accordingly, the system as described above and below can be implemented as an integral stand alone system as suggested by FIG. 1, or can include separate component parts which are interconnected and operable for implementing the invention described below.

Interface device 30 preferably comprises a multi-user network interface (e.g. an Internet interface) which couples computer system 20 to a multi-user system (e.g. the Internet in one embodiment of the present invention). Interface 30 is coupled to permit communication with various application programs contained on the hardware platform defined by computer system 20.

As mentioned above, and in a preferred implementation of the present invention, interface device 30 comprises an Internet interface. The Internet is a well known connection of world wide computer systems that operate using a well known Internet protocol. The Internet is one type of multi-user computer system. Other Internet applications (e.g. using specific protocols) operate on top of the Internet protocol. One such application is the well known world wide web or "www" Internet application which operates using the hypertext transfer protocol or http. The "www" Internet application is a "demand system" in which a user requests information from a site and the site transfers the information back to the user on-line. Also well known is the email Internet application which operates using the simple mail transport protocol or smtp. The email Internet application is a "present system" in that an information transfer command originates from a sender site and information pursuant to that command is presented to the target email address. Another Internet application is the file transfer Internet application which operates using the file transfer protocol ftp. In one embodiment, the present invention utilizes the www, email, and file transfer Internet applications as well as the Internet protocol. Other embodiments of the present invention can be implemented in other multi-user computer environments. For example, the present invention could be implemented with a dedicated multi-user system.

Computer system 20 supports a software configuration which operates under control of a conventional operating system. The operating system permits various application processes to be executed. These include, for example, a communications application which permits data transfer with various remote terminals as will become apparent below. The software environment further includes a data management, storage, and retrieval application that is utilized in connection with data storage device 28. The data management, storage, and retrieval application organizes and stores information which will be described in greater detail below. This information is organized and stored within the environment of the operating system on one or more mass storage devices such as data storage device 28. Other applications conventionally known may be included in the software environment comprising computer system 20.

Figure 2:
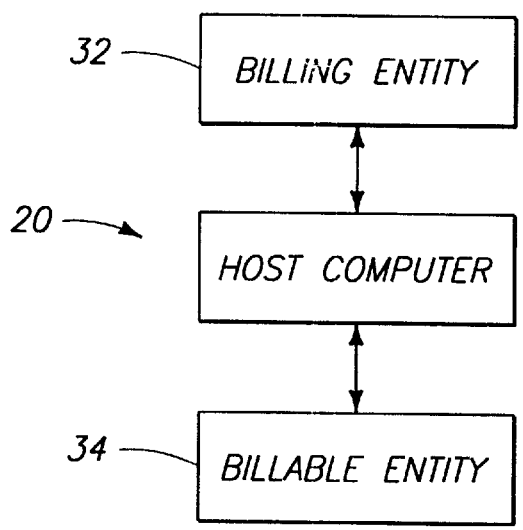
FIG. 2 is a high level organizational diagram illustrating one aspect of the present invention.

In view of the foregoing computer system description and in accordance with one aspect of the invention, the reader is referred to FIG. 2. There, an exemplary computer system or host system 20 can be seen to comprise part of a system which includes a billing entity 32 and a billable entity 34. In the context of this document, the term "billing entity" will be understood to include a company or other source from which a bill for goods and/or services originates. In a preferred implementation, such billing entity can comprise one or more utility providers, e.g. providers of electricity, water, sewage, natural gas, propane, alternate energy sources and/or other related goods or services or processes. Similarly, the term "billable entity" as used in this document will be understood to include an individual or company which is to receive a bill from one or more billing entities.

Figure 5:
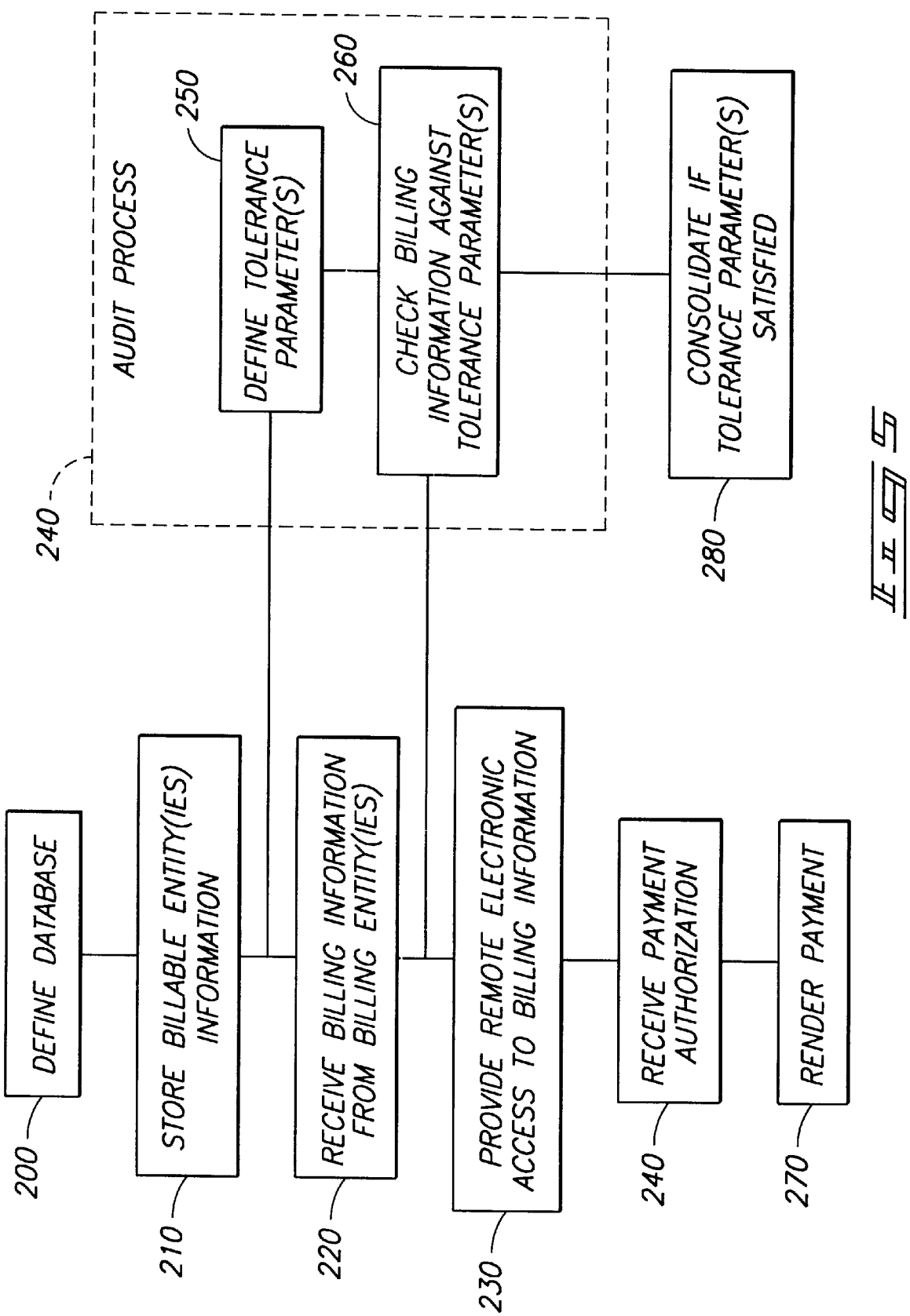
FIG. 5 is a flow diagram illustrating certain methodical aspects of the present invention.

Referring to FIGS. 1, 2, and 5, FIG. 5 presents a high level flow diagram which is or can be implemented with a software program executable on computer system 20 of the present invention. Such program would typically be stored in memory 26. A database is first defined at step 200 (FIG. 5) in host computer 22. Such database is preferably defined within a data storage device, such as data storage device 28 (FIG. 1). Information associated with at least one billable entity, such as billable entity 34, is entered and stored at step 210 in the database. The information can include any type of information which is useful in implementing the present invention. Exemplary information includes the entity's name (whether an individual or a company), mailing address, business phone number, primary accounts payable point of contact, email address, general ledger account number, banking information, and/or site listing. Additionally, information such as site name, site member, site address, square footage, year built, site open date, and billing histories can be stored in the database as well. Exemplary billing history information can include such things as billing date, past due date, billing period begin and end dates, and various other information as will become apparent below.

At step 220 (FIG. 5) billing information from billing entity 32 is received into host computer 22. The billing information is or can be associated with a bill or amount for payment by billable entity 34 to billing entity 32. The billing information can be introduced into system 20 in any suitable way. In one embodiment, billing information from billing entity 32 is received electronically, via a suitable data link with host computer 20, using one or more of the Internet protocols mentioned above. Alternately, billing information can be received in hard-copy form and entered into the host computer as by manual key punch entry. Other methods and systems can, of course, be utilized to permit billing information to be received by host computer 20.

Figure 6:
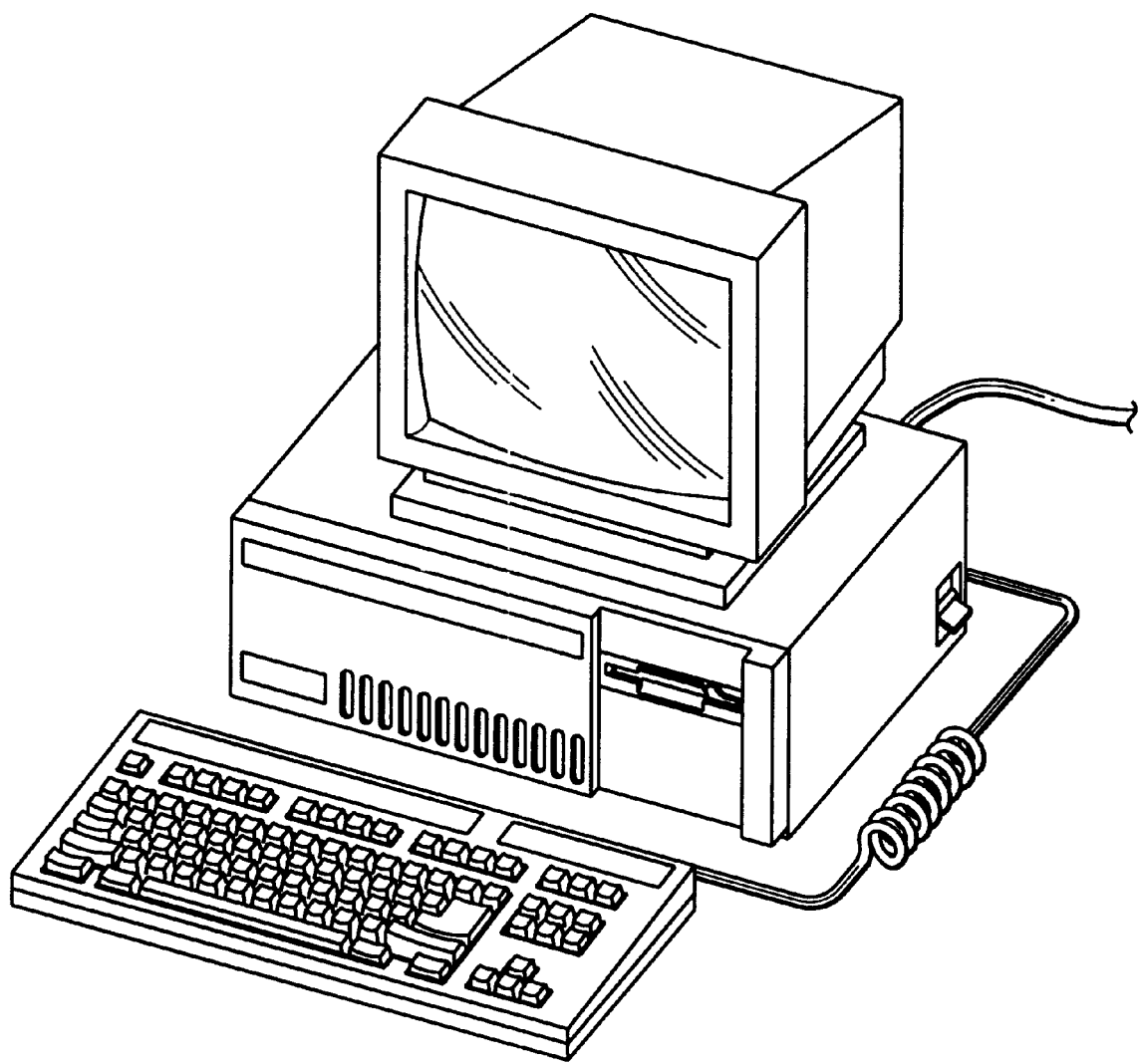
FIG. 6 is an illustration of an exemplary remote electronic access device which can be utilized in implementing the present invention.

With billing information having been received into host computer 20 and/or the database provided within data storage device 28, billable entity 34 is, at step 230, provided with remote electronic access to the billing information in host computer 22. Remote access is preferably provided through a remote computer, such as the one shown in FIG. 6, which is linkable with host computer 22 through a protocol such as one suitable for use within an Internet-based system. In particular, and in connection with a preferred implementation, host computer 22 provides or otherwise defines an Internet web site. The various billing information received by host computer 22 from billing entity 32 is provided on the Internet site and can be remotely accessed by the billable entity. The billable entity can, and preferably does review the billing information and thereafter authorizes payment, preferably electronically through the host computer for payment of an amount due. Preferably, access to information contained on host computer 22 is password-protected such that only the intended billable entity can access its relevant information. In this way, a centralized, computer-accessible, interactive bill paying system is provided which is "proactive" in the sense that the billable entity can, on its on time and terms, access its relevant billing information and thereafter authorize payment thereof through a quick and easy program.

In one aspect of the invention, an audit process is provided at step 240 (FIG. 5). The audit process is preferably implemented in a suitable software application which is resident upon the hardware platform defined by host computer 22. Audit process 240 includes a definition step, at step 250, wherein at least one, and preferably more predetermined tolerance parameters are defined. At step 260, the billing information which is received from billing entity 32 is checked against the pre-determined tolerance parameter(s) for determining whether the billing information satisfies such parameter(s). If the billing information does not satisfy the pre-determined tolerance parameter, then, in accordance with one aspect of the invention, remote access to that billing information can be denied to billable entity 34 (FIG. 2). If the billing information does not satisfy one of the tolerance parameters, a flag is generated and such billing information can be subjected to suitable remedial processing measures, either manually or electronically, to ensure that such billing information is accurate.

In one implementation, the pre-determined tolerance parameters are defined through the utilization of historical billing data for billable entity 34. In particular, when the above-mentioned information regarding the billable entity is stored, at step 210, historical billing data can be entered and cataloged into the database at that time. Additionally, the historical billing data can include currently up-to-date billing information from a previous billing cycle. Processor 24 (FIG. 1) processes the historical billing data and defines the tolerance parameters.

Two exemplary categories of tolerance parameters are: (1) overall bill tolerance check parameters; and (2) individual line item tolerance check parameters. Of course, other tolerance parameters are possible. Examples of overall bill tolerance check parameters include: (a) current charges cannot exceed one and one half times the average bill; (b) bills cannot overlap with any other system bill with respect to begin and end dates; (c) the bill cannot be duplicated within the system; and, (d) all required information must be present on the entered bill. Examples of individual line item tolerance check parameters include: (a) the number of days of service must fall within 20% either way of the account average; (b) service start date must be the day following the prior period bill end date; (c) service end date must be one day prior to next period begin date; (d) service consumption and dollars must move in the same general direction, e.g. an increase in one should be accompanied by an increase in the other; (e) consumption must fall within a 20% difference of prior or next period consumption; and (f) charges must fall within a 20% difference of prior or next period charges. A bill or billing information failing any of the above parameters is flagged and identified for subsequent remedial processing. As history of a particular billable entity is accumulated, tolerances can be redefined based upon the actual variances that exist between months and/or billing periods. Accordingly, the pre-defined tolerance parameters are adjustable by the system for each billable entity.

Figure 3:
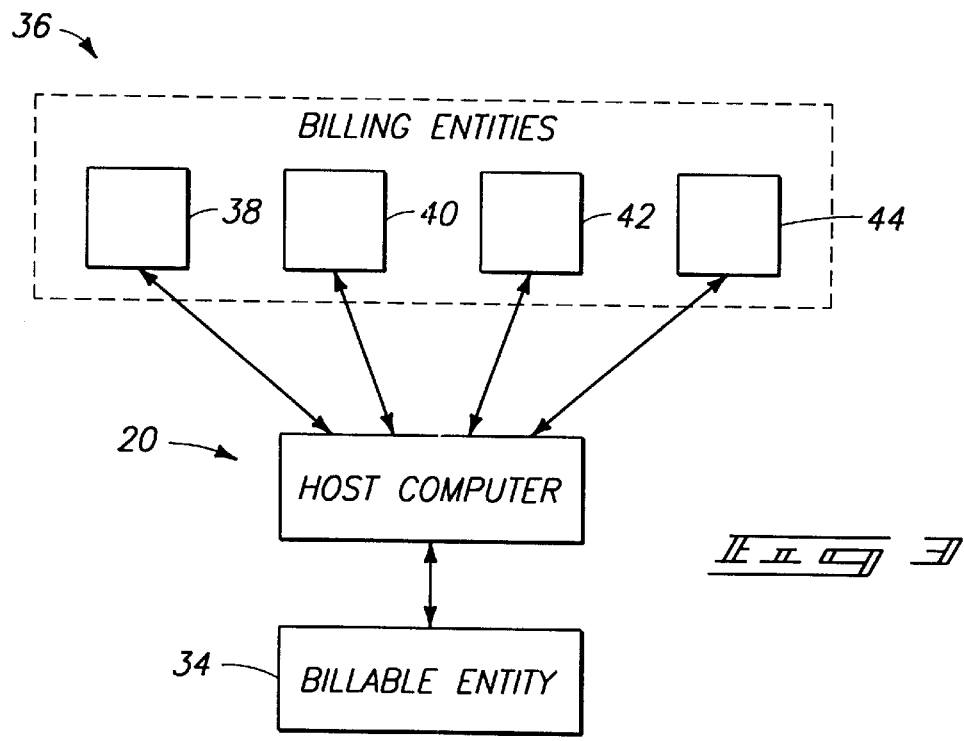
FIG. 3 is a high level organizational diagram illustrating one aspect of the present invention.

Referring to FIG. 3, an implementation in accordance with another aspect of the invention is set forth generally at 36. In this implementation, a plurality of billing entities 38, 40, 42, and 44 provide billing information to host computer 20 such that the host computer can process the information as described immediately above. The billing entities need not be related to one another and preferably comprise separate companies to which payment is to be made by billable entity 34. In a preferred embodiment, processor 24 (FIG. 1) processes the billing information provided by the respective billing entities and provides a consolidated amount comprising individual respective amounts billable entity 34 is to pay to each billing entity 38–44. Through a remote computer terminal, billable entity 34 can access host computer 20 and receive the consolidated amount. Preferably, such access is provided through interface device 30 (FIG. 1) as discussed above.

Upon receiving the consolidated amount, billable entity 34 can, at step 240 (FIG. 5) authorize payment thereof. Payment authorization is preferably provided to host computer 22 via an electronic communication which is effected between the host computer and the remote terminal. Upon receiving payment authorization from billable entity 34, computer system 20 is configured to render payment, at step 270, to each of billing entities 38–44. Such payment can be rendered in any number of ways. In a preferred implementation, payment is rendered through automated clearing house (ACH) transfer. More particularly, after payment authorization has been received by the host system, an ACH protocol is implemented in which the host system contacts the billable entity's bank or financial institution. The protocol then electronically transfers funds from the billable entity's account to an account which is managed or controlled by computer system 20. After the ACH transfer, disbursement of payments to the individual billing entities or each's associated banking institution can take place within a suitable amount of time.

As in the above example, an audit process 240 (FIG. 5) can be, and preferably is provided to ensure that the consolidated amount provided by host computer 22 is accurate. In a preferred implementation, and prior to processing the billing information to provide the consolidated amount, the billing information is checked at step 260 against one or more of the tolerance parameters (step 250). If the billing information satisfies the tolerance parameter, then at step 280 it is consolidated. Responsive to a condition in which the billing information does not satisfy the tolerance parameter, such billing information is excluded from the consolidated amount. For example, and with reference to FIG. 3, various billing information is received from each of billing entities 38, 40, 42, and 44. Each data packet of billing information received from each billing entity is scrutinized under the audit processing function to ensure that the billing information satisfies the tolerance parameters described above. If one of the billing entities, say for example billing entity 38, provides billing information that fails one tolerance parameter, the amount contributed by billing entity 38 is excluded from consolidation until resolution of that entity's billing information. Accordingly, a respective amount which is associated with the billing information which did not satisfy one of the tolerance parameters, e.g. the billing information from billing entity 38, is excluded from consolidation. As an alternative to excluding such information from the consolidated amount, an estimate can be made, based on historical billing information, so that the billable entity receives a consolidated bill which closely approximates the actual bill. Any overages or underages can be made up during the next billing cycle.

Again, a centralized, computer-accessible, interactive bill paying system is provided which is "proactive" in the sense that the billable entity can, on its on time and terms, access its relevant billing information and thereafter authorize payment thereof through a quick and easy program. Further, a system is provided which receives billing input from a number of different billing entities, checks the information against known or calculatable tolerance parameters, and provides a singular amount which, through electronic communication, can be authorized for payment by the entity which is billed. Accordingly, a very streamlined and efficient process is provided by the various implementations of the invention.

Figure 4:
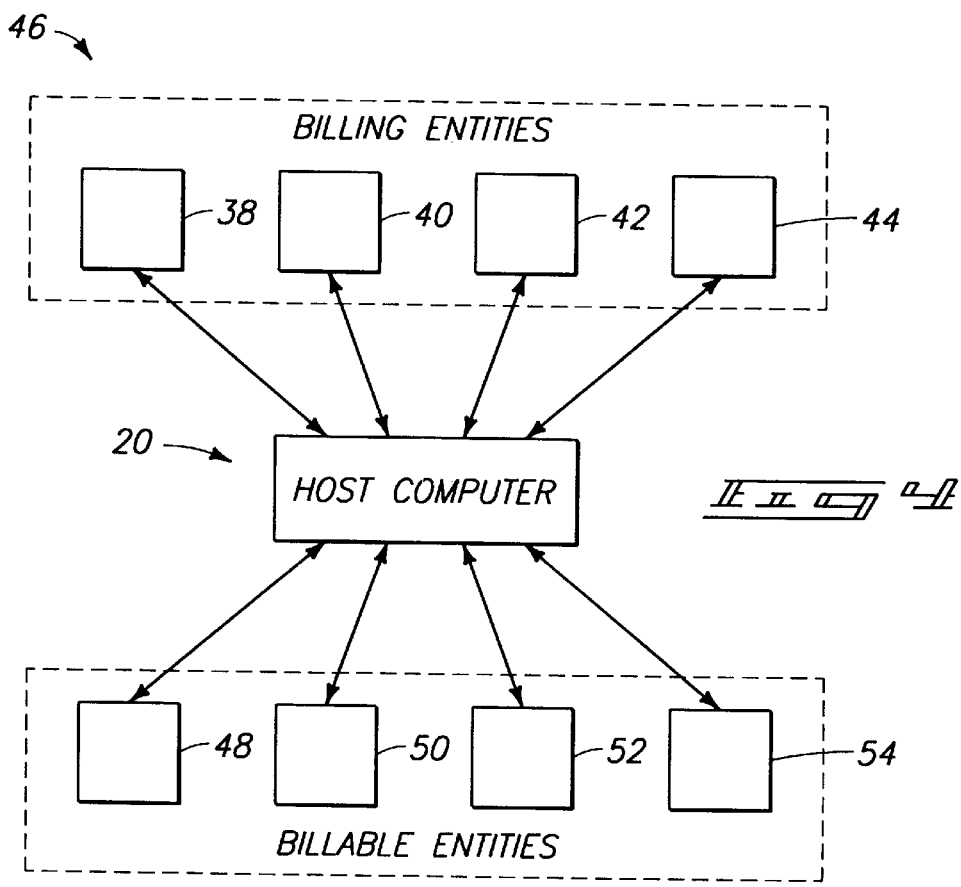
FIG. 4 is a high level organizational diagram illustrating one aspect of the present invention.

Referring to FIG. 4, another implementation in accordance with the invention is set forth generally at 46. There, it can be seen that a plurality of billing entities 38–44 have access, or are otherwise capable of providing billing information to computer system 20. A plurality of billable entities 48, 50, 52, and 54 have remote electronic access to computer system 20 in much the way as was described above. It is to be understood that although only four billing entities and four billable entities are utilized in the illustration, many more of both entities are contemplated.

In this example, a database within host system 20 receives and stores information associated with each of billable entities 48–54. Billing information is received into host computer 20 from billing entities 38–44. Such information is made available, through remote computer terminal access, to each of the billable entities. In accordance with a preferred implementation, and prior to providing the billable entities with remote access, the billing information from each of the billing entities is scrutinized by host computer 22 to determine whether it meets or satisfies one or more of the above-identified tolerance parameters. Failing any one of the tolerance parameters results in that particular amount being excluded from a consolidated amount which is subsequently provided, via billable-entity access, to each billable entity. In the illustrated example, the billable entities would still receive a consolidated amount comprising an aggregate of each individual amount from the billing entities which did, in fact, pass scrutiny under the tolerance parameters.

In one aspect, a consolidated payment can be made to each billing entity (or each's respective financial institution), with separate accounting for the individual constituent parts of the payment. For example, billing entity 38 may have payments due from each of billable entities 48, 50, 52, and 54. Rather than four separate payments being rendered to billing entity 38, one consolidated payment comprising each of the four separate payments can be made. Such simplifies not only the payment process on the payment end, but the accounting process on the receiving end of the transaction as well. In addition and in accordance with another aspect of the invention, historical billing data for any or each of the billable entities can be utilized by the system to formulate an estimate of a particular constituent amount due, or a consolidated amount for presentation to the billable entity. Accordingly, those amounts which might fail a tolerance parameter and otherwise be excluded from a consolidated amount would, in this instance, be estimated and billed as part of the consolidated amount. Any overages or underages could be subsequently accounted for in the next billing cycle.

Again, a centralized, computer-accessible, interactive bill paying system is provided which is "proactive" in the sense that the billable entity can, on its on time and terms, access its relevant billing information and thereafter authorize payment thereof through a quick and easy program. Further, a system is provided which receives billing input from a number of different billing entities, checks the information against known or calculatable tolerance parameters, and provides a singular amount which, through electronic communication, can be authorized for payment by the entity which is billed. In this implementation a plurality of different billable entities are incorporated into the system of the present invention. Accordingly, a very streamlined and efficient process is provided by the various implementations of the invention.

Figure 7:
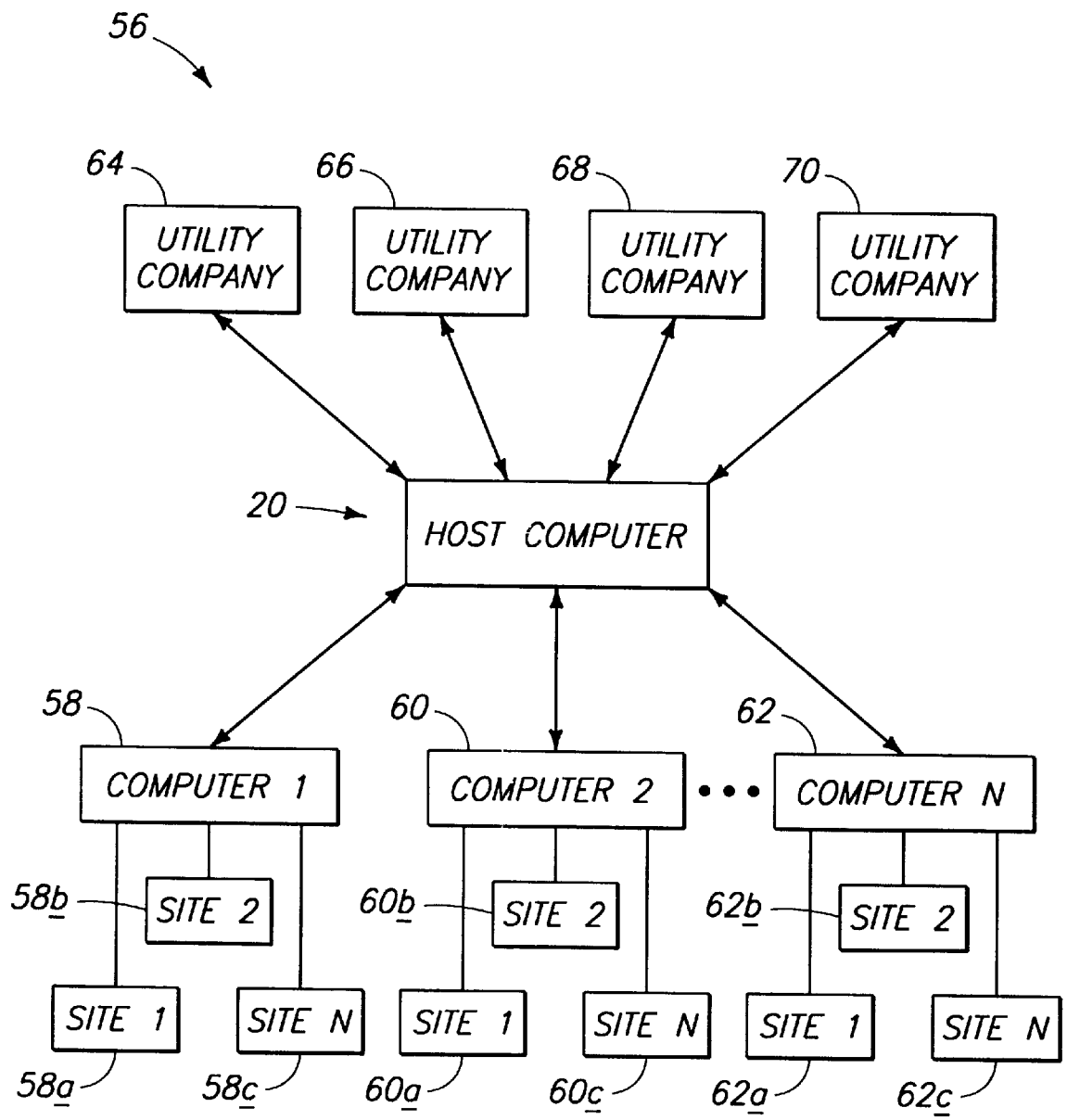
FIG. 7 is a high level organizational diagram illustrating a preferred embodiment of the present invention.

Referring to FIG. 7, a preferred implementation of the invention is set forth generally at 56. Similar to the above implementation, a computer system 20 is provided and includes a host computer 22 as described above. Information for a plurality of customers 58, 60, and 62 is stored in a database as described above. The customers are customers of a plurality of different utility providers 64, 66, 68, and 70. Each customer may, however, be a customer of only one utility. Alternately, each customer may be a customer of more than one utility. Billing information is received from each utility company into host computer 22 as described above in connection with step 220 (FIG. 5). The billing information is associated with a bill for payment by each customer to a particular utility provider. The billing information includes an amount each customer is to pay. In accordance with one implementation, customers 58–62 are provided with remote electronic access to the billing information in host computer 20 through interface device 30 (FIG. 1) as described above. The customer can then receive the billing information and authorize payment by the host system, preferably electronically (both authorization and payment).

As described above, an audit process 240 (FIG. 5) can be provided to ensure that the billing information is accurate prior to providing each customer with remote electronic access thereto. In another implementation, and one in which a plurality of customers are being serviced by a plurality of different utility providers, billing information is received from each utility provider. The billing information concerns each of their respective customers. The billing information which is received from each utility provider is processed by host computer 20 to provide a consolidated amount for payment by each customer. The consolidated amount comprises each respective amount the customer is to pay to a particular utility provider. Through the above-described remote electronic access, each customer can access host computer 20 via interface device 30 (FIG. 1) wherein the customers can receive the consolidated amount as an amount owed. Subsequently, each customer is able to provide payment authorization for electronic payment of its consolidated bill. Such payment authorization is received by host computer 20 and payment subsequently rendered to each of the utility providers as discussed above.

Prior to consolidation, and in accordance with the preferred embodiment, historical billing data for each of the customers is processed to define at least one, and preferably more tolerance parameters. These tolerance parameters, as in the above-described embodiments, are utilized to ensure that the billing information which is received from each utility provider is accurate. Only after ensuring that the billing information from each utility provider is accurate, is such information consolidated into the consolidated amount which is accessible by the customer.

The inventive methodologies and systems described just above are particularly useful in the context of utility customers having a number of different, geographically-separated sites (such as nationwide) which are serviced by a plurality of different utilities.

For example, and with reference to FIG. 7, customer 58 includes sites 58*a,* 58*b,* and 58*c.* Although only three exemplary sites are used, it will be understood that such sites can comprise any number of different sites which may or may not be geographically-separated. Similarly, customer 60 includes site 60*a,* 60*b,* and 60*c.* Likewise, customer 62 includes site 62*a,* 62*b,* and 62*c.* For purposes of example only, assume that each geographically-separated site of any of the customers is serviced by a different utility provider or company. Each utility provider is able to, through the inventive methodologies and systems, provide billing information for each specific geographically-separated site to computer system 20. Such information is received, processed, screened and/or otherwise scrutinized, and provided so that each customer, e.g. customers 58, 60, 62, can receive a consolidated amount owed for the collective utility services provided to each of its sites. For each specific site of any one customer, historical billing data can be, and preferably is maintained by computer system 20 so that upon receipt of the billing information from the applicable utility provider, such can be scrutinized, under the audit process described above, to ensure that an accurate consolidated bill is provided to each customer. If the billing information for any one site fails any one of the tolerance parameters, such amount is excluded from consolidation and subjected to remedial processing as described above. Accordingly, the customer, in this instance, would receive a consolidated amount comprising respective amounts for each site which resulted from billing information which did, in fact, pass the scrutiny of the audit process.

In brief summary, the invention, in one implementation, provides a host system and a database within the host system. The database maintains information associated with a plurality of customers being serviced by a plurality of different utility providers. A plurality of remote customer data terminals are communicatively linkable with the host system for data exchange. A processor within the host system is configured to provide and receive data transmissions between the host system and the remote customer data terminals via data paths or links which are established therebetween. The processor of the host system is configured to receive billing information from the utility providers for each of its customers whose information is being maintained by the host system database. The processor is configured to provide a consolidated amount, for any one customer, of all of the amounts owed to the utility provider(s). The host system preferably includes historical billing data in its database for at least some, and preferably all of the customers. Historical billing data which is not present in the system can, over time, be developed and maintained by the system. The processor processes the historical billing data to define at least one, and preferably more tolerance parameters. Billing information which is received from each of the utility providers is then compared with and checked against the tolerance parameters. In the event the billing information fails only one of the tolerance parameters, that particular amount corresponding to the failed billing information is not consolidated.

The processor and host system are configured to be communicatively linkable with the individual remote customer data terminals via a link which is initiated by the individual remote customer data terminal. Upon the link being initiated by an individual remote customer data terminal, the processor is configured to provide a consolidated amount to each customer which can then authorize payment by the host system. In one aspect, the consolidated amount received by each customer can be processed to include electronic signature protection. Such protection can be useful in the context of internal customer-specific routing operations in which customers receive such information, and route it electronically or otherwise, to the appropriate department or personnel for authorization and/or payment. Payment is preferably rendered through an electronic funds transfer process such as ACH. Other payment schemes can, of course, be utilized. For example, payment can be render by check, credit card, certified check, or any other suitable payment means. In one aspect of the invention, information such as accounts/payable information can be processed and compiled by the host system and subsequently provided, as by electronically downloading such information through a suitable communications link, so that any or each billable entity is able to update computer records pertaining to such information. The billable entities could, in some respects, use such accounts/payable or other information to render payment on their own.

As was initially discussed above, the systems and methodologies of the present invention are preferably implemented in connection with a multi-user computer environment. A preferred computer environment is the Internet. Accordingly, and with reference to FIGS. 8–12, exemplary displays are illustrated which can be supported on a remote computer terminal, such as the one shown in FIG. 6, for each customer (e.g. billable entity) to utilize in accessing their billing information.

Referring to FIG. 8, a welcome screen 100 is displayed for a website supported by the host computer which allows access to computer system 20. A particular customer or company can enter its name in field 102, as well as its unique password in field 104. Accordingly, password protection insures that proper security measures are present and prevents unauthorized access.

Figure 9:
FIG. 9 is a view of another interactive computer screen implemented in connection with a preferred embodiment of the present invention.

Referring to FIG. 9, a screen 106 is presented which includes a number of different fields for gathering information about the customer and, where applicable, each site maintained by a customer. A site set up field 108 is provided in which a customer can enter each of its individual sites into the system. A site address field is provided at 110. Information which is gathered on each customer can be gathered through a data entry web site having a data entry screen such as screen 106, through conventional hard-copy form, or through transmitted email files, and the like. Such information is or can be utilized in building and maintaining historical billing data and includes such things as corporate name, site, billing information, and utility account information.

Referring to FIG. 10, a consolidated bill screen 118 is provided. In the illustrated example, the consolidated bill screen provides invoice details for each customer. Each time an invoice or consolidated bill is prepared, a row is created in a consolidated billing table 120. Individual rows 120*a,* 120*b,* and 120*c* are illustrated. In this example, fields for each row include: an "I/V" field, an "Invoice Date/Billing Date" field, an "Invoice #" field, an "Invoice Amt" field, a "Last Payment" field, a "Consolidated Charges" field, a "# of Bills" field, an "Acct Level" field, and a "G/L" (General Ledger) field.

Consolidated billing table 120 corresponds to a table that a customer, such as customer 58 in FIG. 7, would see upon accessing the billing system. Each row describes a different invoice which, in turn, includes a billed amount which corresponds to a consolidated charge. To view an invoice, a customer can click on the "I/V" symbol at the far left of each row. The invoice can be printed by clicking on a printer icon that is part of the report. Arrow keys can be used to navigate through the invoice pages, e.g. first page, next page, previous page, last page. As payments are received, the "Last Payment" field is updated. An ASCI fixed column flat file can be prepared and downloaded to each customer for general ledger information (by clicking on the "G/L" symbol). Graphical information can be used in this report to illustrate amounts of the consolidated bills. If more than one consolidated bill is prepared during any one month, the amounts can be stacked and offset with color. When invoices and/or consolidated bills are prepared, an email notification can be sent, via Internet, to designated customers. In one aspect, an icon can be provided which, when clicked upon, allows a customer to view "unconsolidated" invoices. That is, once particular billing information is received and becomes part of the system, a customer, prior to consolidation, can enter the system and view the individual amount comprising the consolidated amounts.

Each customer can, upon clicking on the "Details" link, view account information which pertains to a specific row. For example, account information for row 120b is shown in FIG. 11. A site table 122 includes a "Site" field, an "Address" field, a "Utility" field, a "Utility Acct Number" field, a "Bill Date" field, a "Total Bill" field, and a "Service Details" field.

Site table 122 includes a plurality of rows 122a, 122b, 122c, and 122d. Each row, in turn, corresponds to a particular site of the customer. For example, row 122a describes a "Denver Mountain Suites" site for a customer which would correspond to customer 58 (FIG. 7). The "Denver Mountain Suites" site is described as being serviced by the Public Service Company of Colorado. Row 122c describes a "Detroit Luxury Suites" site which is serviced by City of Grand Rapids Water and Sewer. Each individual amount which is owed by a particular site is set forth in the "Total Bill" field. Each amount appearing in the "Total Bill" field is processed in accordance with the inventive methodologies described above, to arrive at a consolidated charge or amount which is provided in the consolidated billing table 120 described above.

At this level, service details can be ascertained by clicking on the "Details" link which enables a customer to view an invoice amount for each particular site. Specifically, and with reference to FIG. 12, account details for "Hartford Village Suites" (row 122d in FIG. 11) are shown. A service details table 124 is provided and includes fields for "Service", "Meter", "Begin Date", End Date", "Days" (of service), "Quantity" or usage, "Tax", and "Amount". For example, one can ascertain by reference to the service details table that the Hartford Village Suites, from a period beginning on Apr. 23, 1997, through May 21, 1997, had 29 days of electric consumption and consumed a total of 58,113 kilowatt hours. The tax for such usage was $177.52, and the amount owed for the electric consumption was $3,490.79. All of the amounts in the "Amount" field of service details table 124 are summed and appear as a total bill for the Hartford Village Suite site on site table 122.

Service details table 124 enables a customer to view individual dollar amounts for consumption of electric, demand, gas, water, and sewer if reported on the bill. In addition, power factor (kVar) and late charges can be tracked as well.

Accordingly, a customer can, at the click of a mouse, ascertain billing charges for each of its sites and authorize payment thereof. This tool is extremely useful for customers having hundreds or even thousands of sites. The systems and methodologies of the invention provide an interactive, convenient, and easy-to-use billing and accounting system which allows a customer with numerous sites being serviced by possibly numerous utility providers to ascertain, in the blink of an eye, relevant billing information in a consolidated and concise format.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A computerized billing and payment authorization method comprising:

defining a database in a host computer;

storing in said database information associated with a billable entity from which payment authorization is to be received;

receiving billing information into said host computer from a billing entity, said billing information being associated with a bill for payment by said billable entity to said billing entity, said billing information including an amount said billable entity is to pay;

providing said billable entity with remote electronic access to said billing information in said host computer wherein said billable entity can receive said billing information and authorize payment thereof; and prior to providing said billable entity with remote electronic access, performing an audit of said billing information against pre-determined tolerance parameters and determining whether said billing information satisfies said tolerance parameters.

2. The computerized billing and payment authorization method of claim 1, wherein said remote electronic access is provided through a remote computer linkable with said host computer.

3. The computerized billing and payment authorization method of claim 1, wherein said host computer comprises an audit processor configured for performing said audit upon receipt of said billing information into said host computer.

4. The computerized billing and payment authorization method of claim 1, wherein said receiving of said billing information comprises electronically receiving said billing information from said billing entity.

5. The computerized billing and payment authorization method of claim 1, wherein said receiving of said billing information comprises receiving a printed copy of said billing information and entering said billing information into said host computer.

6. The computerized billing and payment authorization method of claim 1, wherein said providing remote electronic access comprises password-protecting said host computer.

7. The computerized billing and payment authorization method of claim 1, wherein said pre-determined tolerance parameters are adjustable.

8. The computerized billing and payment authorization method of claim 7, wherein said pre-determined tolerance parameters are adjustable by said billable entity.

9. The computerized billing and payment authorization method of claim 1, wherein said providing remote electronic access comprises defining a web site on the Internet and providing said billing information on said web site.

10. The computerized billing and payment authorization method of claim 10, wherein said remote electronic access is provided through a remote computer linkable with said host computer and configured to access said web site.

11. A computerized bill consolidating and payment authorization method comprising:

defining a database in a host computer comprising a processor with associated memory and at least one interface device;

storing in said database information associated with a billable entity from which payment authorization is to be received, said storing comprising storing historical billing data for said billable entity in said database, and processing said historical billing data to define at least one tolerance parameter for billing information received from at least one billing entity;

receiving into said host computer billing information from a plurality of billing entities to which payment is to be made, said billing information being associated with bills for payment by said billable entity to said billing entities, said billing information including respective amounts said billable entity is to pay;

processing said billing information and providing a consolidated amount comprising individual respective amounts said billable entity is to pay; and providing said billable entity with remote-computer-terminal access to said host computer wherein said entity can receive said consolidated amount through said interface device and authorize payment thereof, and further comprising:

prior to processing said billing information to provide said consolidated amount, checking said billing information received from said at least one billing entity against said tolerance parameter for said at least one billing entity to determine whether said billing information satisfies said tolerance parameter; and responsive to a condition in which said billing information does not satisfy said tolerance parameter, excluding from said consolidated amount a respective amount associated with the billing information which does not satisfy said tolerance parameter.

12. The computerized bill consolidating and payment authorization method of claim 11, wherein said billable entity can receive said billing information through said interface device.

13. The computerized bill consolidating and payment authorization method of claim 11, wherein said host computer is configured to receive electronic authorization for payment.

14. The computerized bill consolidating and payment authorization method of claim 11, wherein said receiving of said billing information comprises electronically receiving said information from at least one of said billing entities through said interface device.

15. The computerized bill consolidating and payment authorization method of claim 11, wherein said receiving of said billing information comprises electronically receiving said information from each of said billing entities through said interface device.

16. The computerized bill consolidating and payment authorization method of claim 11, wherein said providing of said billable entity with remote-computer-terminal access comprises assigning said billable entity a password for use in accessing said billing information through said interface device.

17. The computerized bill consolidating and payment authorization method of claim 11 further comprising:

receiving payment authorization from said billable entity; and responsive to receiving said payment authorization, rendering payment to said billing entities.

18. The computerized bill consolidating and payment authorization method of claim 17, wherein said rendering of payment comprises rendering said payment through automated clearing house (ACH) transfer.

19. A utility billing access and payment method comprising:

defining a database in a host computer comprising a processor and an interface device;

storing in said database information associated with a customer of a utility provider and from whom payment authorization is to be received, said storing comprising storing historical billing data for said customer in said database, and processing said historical billing data to define a tolerance parameter for billing information received from said utility provider;

receiving into said host computer billing information from said utility provider pertaining to said customer, said billing information being associated with a bill for payment by said customer to said utility provider, said billing information including an amount said customer is to pay; and providing said customer with remote electronic access to said billing information in said host computer through said interface device, wherein said customer can receive said billing information and authorize payment thereof, and further comprising:

prior to providing said customer with remote electronic access to said billing information, checking said billing information received from said utility provider against said tolerance parameter to determine whether said billing information satisfies said tolerance parameter; and responsive only to a condition in which said billing information satisfies said tolerance parameter providing said customer with said remote electronic access.

20. The utility billing access and payment method of claim 19, wherein said processing of said historical billing data defines a plurality of tolerance parameters, and each of said tolerance parameters must be satisfied prior to said customer being provided with said remote electronic access.

21. The utility billing access and payment method of claim 19, wherein said remote electronic access is provided through a remote computer terminal configured to establish a data link with said interface device.

22. The utility billing access and payment method of claim 19, wherein said receiving of said billing information from said utility comprises electronically receiving said information through said interface device.

23. The utility billing access and payment method of claim 19 further comprising:

receiving payment authorization from said customer; and rendering payment to said utility.

24. The utility billing access and payment method of claim 23, wherein said receiving payment authorization comprises electronically receiving said authorization through said interface device.

25. The utility billing access and payment method of claim 23, wherein said rendering payment comprises rendering said payment through an automated clearing house (ACH) transfer.

26. A utility billing access and consolidating method comprising:

defining a database in a host computer comprising a processor and an interface device;

storing in said database information associated with a plurality of customers being serviced by a plurality of different utility providers and from which payment authorization is to be received, said storing comprising storing historical billing data for said customers in said database, and processing said historical billing data to define a tolerance parameter for billing information received from said utility providers;

receiving billing information from said utility providers for each of their customers, said billing information being associated with bills including respective amounts for each utility provider which said customers are to pay;

processing said billing information to provide a consolidated amount for payment by each customer, said consolidated amount comprising each respective amount said customer is to pay to a particular utility provider; and providing said customers with remote electronic access to said host computer via said interface device wherein each of said customers can receive said consolidated amount as an amount owed, and further comprising:

prior to providing said customers with remote electronic access to said consolidated amount, checking said billing information received from said utility providers against said tolerance parameter to determine whether said billing information satisfies said tolerance parameter; and responsive only to a condition in which said billing information satisfies said tolerance parameter providing said customers with said remote electronic access.

27. The utility billing access and consolidating method of claim 26, wherein said remote electronic access is provided through a remote computer terminal configured to establish a data link with said host computer through said interface device.

28. The utility billing access and consolidating method of claim 26, wherein said receiving of said billing information comprises electronically receiving said information through said interface device.

29. The utility billing access and consolidating method of claim 26, wherein at least one of said customers comprises a plurality of geographically-separated sites, at least one site being serviced by a different one of said plurality of utility providers, and:

wherein said receiving of said billing information comprises receiving billing information for each site; and said processing comprises providing a consolidated amount for said one customer which comprises a respective amount owed for each site.

30. The utility billing access and consolidating method of claim 26 further comprising enabling said customers to provide electronic payment authorization through said interface device.

31. The utility billing access and consolidating method of claim 30 further comprising receiving payment authorization from said customers and rendering payment to each utility provider.

32. A computerized bill consolidating and payment authorization method comprising:

defining a database in a host computer comprising a processor with associated memory and at least one interface device;

storing in said database information associated with a billable entity from which payment authorization is to be received, said storing comprising storing historical billing data for said billable entity in said database, and processing said historical billing data to define a plurality of tolerance parameters for billing information received from said plurality of billing entities;

receiving into said host computer billing information from a plurality of billing entities to which payment is to be made, said billing information being associated with bills for payment by said billable entity to said billing entities, said billing information including respective amounts said billable entity is to pay;

processing said billing information and providing a consolidated amount comprising individual respective amounts said billable entity is to pay; and providing said billable entity with remote-computer-terminal access to said host computer wherein said entity can receive said consolidated amount through said interface device and authorize payment thereof, and further comprising:

prior to processing said billing information to provide said consolidated amount, checking said billing information received from each billing entity against said tolerance parameters for said billing entities to determine whether said billing information satisfies said tolerance parameters; and responsive to a condition in which said billing information does not satisfy said tolerance parameters, excluding from said consolidated amount a respective amount associated with the billing information which does not satisfy said tolerance parameters.

33. The computerized bill consolidating and payment authorization method of claim 32, wherein said billable entity can receive said billing information through said interface device.

34. The computerized bill consolidating and payment authorization method of claim 32, wherein said host computer is configured to receive electronic authorization for payment.

35. The computerized bill consolidating and payment authorization method of claim 32, wherein said receiving of said billing information comprises electronically receiving said information from at least one of said billing entities through said interface device.

36. The computerized bill consolidating and payment authorization method of claim 32, wherein said receiving of said billing information comprises electronically receiving said information from each of said billing entities through said interface device.

37. The computerized bill consolidating and payment authorization method of claim 32, wherein said providing of said billable entity with remote-computer-terminal access comprises assigning said billable entity a password for use in accessing said billing information through said interface device.

38. The computerized bill consolidating and payment authorization method of claim 32 further comprising:

receiving payment authorization from said billable entity; and responsive to receiving said payment authorization, rendering payment to said billing entities.

39. The computerized bill consolidating and payment authorization method of claim 32, wherein said rendering of payment comprises rendering said payment through automated clearing house (ACH) transfer.

40. A utility billing access and consolidating method comprising:

defining a database in a host computer comprising a processor and an interface device;

storing in said database information associated with a plurality of customers being serviced by a plurality of different utility providers and from which payment authorization is to be received, wherein at least one of said customers comprises a plurality of geographically-separated sites, at least one site being serviced by a different one of said plurality of utility providers, and wherein said storing comprises storing historical billing data for said customers, including each geographically-separated site of any of the customers, in said database, and processing said historical billing data to define a tolerance parameter for billing information received from said utility providers;

receiving billing information from said utility providers for each of their customers, said billing information being associated with bills including respective amounts for each utility provider which said customers are to pay, wherein said receiving of said billing information comprises receiving billing information for each site;

processing said billing information to provide a consolidated amount for payment by each customer, said consolidated amount comprising each respective amount said customer is to pay to a particular utility provider, said processing comprises providing a consolidated amount for said one customer which comprises a respective amount owed for each site; and providing said customers with remote electronic access to said host computer via said interface device wherein each of said customers can receive said consolidated amount as an amount owed, and further comprising:

prior to providing said customers with remote electronic access to said consolidated amount, checking said billing information received from said utility providers against said tolerance parameter to determine whether said billing information satisfies said tolerance parameter; and responsive only to a condition in which said billing information satisfies said tolerance parameter providing said customers with said remote electronic access.

41. The utility billing access and consolidating method of claim 40, wherein said remote electronic access is provided through a remote computer terminal configured to establish a data link with said host computer through said interface device.

42. The utility billing access and consolidating method of claim 40 further comprising enabling said customers to provide electronic payment authorization through said interface device.

43. The utility billing access and consolidating method of claim 42 further comprising receiving payment authorization from said customers and rendering payment to each utility provider.

44. The utility billing access and consolidating method of claim 40, wherein said receiving of said billing information comprises electronically receiving said information through said interface device.

\* \* \* \* \*

UNITED STATES PATENT AND TRADEMARK OFFICE
CERTIFICATE OF CORRECTION

PATENT NO. : 5,943,656
DATED : August 24, 1999
INVENTOR(S) : Crooks et al.

It is certified that error appears in the above-identified patent and that said Letters Patent is hereby corrected as shown below:

Column 13, line 2, delete "10", and insert --9--

Signed and Sealed this

Eighteenth Day of July, 2000

Attest:

Q. TODD DICKINSON

*Attesting Officer*     *Director of Patents and Trademarks*